US010173172B2

(12) United States Patent
Hartbrich et al.

(10) Patent No.: US 10,173,172 B2
(45) Date of Patent: Jan. 8, 2019

(54) DEVICE AND METHOD FOR TREATING A GAS LADEN WITH POLLUTANTS

(71) Applicant: SILICA Verfahrenstechnik GmbH, Berlin (DE)

(72) Inventors: Andreas Hartbrich, Berlin (DE); Gerd Hoehne, Berlin (DE); Burkhard Schlicht, Berlin (DE); Jens Moellmer, Schkeuditz (DE); Mike Wecks, Leipzig (DE); Joerg Hofmann, Leipzig (DE)

(73) Assignee: SILICA Verfahrenstechnik GmbH, Berlin (DE)

( * ) Notice: Subject to any disclaimer, the term of this patent is extended or adjusted under 35 U.S.C. 154(b) by 86 days.

(21) Appl. No.: 15/433,691

(22) Filed: Feb. 15, 2017

(65) Prior Publication Data

US 2017/0232386 A1 Aug. 17, 2017

(30) Foreign Application Priority Data

Feb. 15, 2016 (DE) .................... 10 2016 001 674
Jan. 28, 2017 (DE) .................... 10 2017 001 114

(51) Int. Cl.
*B01D 53/04* (2006.01)
*B01D 53/82* (2006.01)
(Continued)

(52) U.S. Cl.
CPC ......... *B01D 53/82* (2013.01); *B01D 53/0407* (2013.01); *B01D 53/0431* (2013.01);
(Continued)

(58) Field of Classification Search
CPC ............ B01D 53/0407; B01D 53/0431; B01D 53/685; B01D 53/70; B01D 53/72; B01D 53/82; B01D 2253/102; B01D 2253/306; B01D 2253/34; B01D 2257/2064; B01D 2257/70; B01D 2257/7022; B01D 2257/7027; B01D 2259/40096;
(Continued)

(56) References Cited

U.S. PATENT DOCUMENTS 4,046,525 A * 9/1977 Matsuo .............. B01D 53/0407
55/302
4,181,513 A * 1/1980 Fukuda .............. B01D 39/1623
96/153

(Continued)

FOREIGN PATENT DOCUMENTS

DE 4104513 C2 11/1996
DE 10032385 A1 1/2002
(Continued)

*Primary Examiner* — Frank M Lawrence, Jr.
(74) *Attorney, Agent, or Firm* — Norris McLaughlin, P.A.

(57) ABSTRACT

A device for treating a gas laden with pollutants, includes at least one adsorption module for adsorbing the pollutants, which is utilized in an adsorption apparatus. The adsorption module includes at least one electrically conductive layer of an activated carbon fiber mat, an electric current circuit for heating the activated carbon fiber mat for the desorption of the adsorbed pollutants, and distributing conduit which is routed into the center of the adsorption module and has outlet openings for a flush gas for inertizing and rinsing the activated carbon fiber mat.

28 Claims, 11 Drawing Sheets

(51) Int. Cl.
  *B01D 53/68* (2006.01)
  *B01D 53/70* (2006.01)
  *B01D 53/72* (2006.01)
  *B01J 20/20* (2006.01)
  *B01J 20/28* (2006.01)
  *B01J 20/34* (2006.01)
  *C01B 32/366* (2017.01)

(52) U.S. Cl.
  CPC .......... *B01D 53/685* (2013.01); *B01D 53/70* (2013.01); *B01D 53/72* (2013.01); *B01J 20/20* (2013.01); *B01J 20/28038* (2013.01); *B01J 20/3416* (2013.01); *B01J 20/3441* (2013.01); *B01D 2253/102* (2013.01); *B01D 2253/306* (2013.01); *B01D 2253/34* (2013.01); *B01D 2257/2064* (2013.01); *B01D 2257/70* (2013.01); *B01D 2257/7022* (2013.01); *B01D 2257/7027* (2013.01); *B01D 2259/40096* (2013.01); *C01B 32/366* (2017.08)

(58) Field of Classification Search
  CPC ... C01B 32/366; B01J 20/20; B01J 20/28038; B01J 20/3416; B01J 20/3441
  USPC ...... 96/121, 126, 130, 143, 149, 154; 95/97, 95/104, 106, 114, 148
  See application file for complete search history.

(56) References Cited

U.S. PATENT DOCUMENTS

| | | | |
|---|---|---|---|
| 4,731,100 A * | 3/1988 | Loeffelmann | B01D 46/0068 55/294 |
| 4,737,164 A | 4/1988 | Sarkkinen | |
| 6,197,097 B1 * | 3/2001 | Ertl | B01D 53/0407 96/129 |
| 6,364,936 B1 | 4/2002 | Rood et al. | |
| 6,454,834 B1 * | 9/2002 | Livingstone | B01D 53/04 55/385.3 |
| 6,905,534 B2 * | 6/2005 | Chang | B01D 53/0407 110/345 |
| 7,316,731 B2 * | 1/2008 | Farant | B01D 53/02 95/106 |
| 2002/0088344 A1 | 7/2002 | Chmiel et al. | |
| 2012/0067215 A1 * | 3/2012 | Lindahl | B01D 39/1623 95/90 |
| 2016/0206990 A1 * | 7/2016 | Bossan | B01D 53/04 |

FOREIGN PATENT DOCUMENTS

| | | |
|---|---|---|
| DE | 69827676 T2 | 12/2005 |
| EP | 0532814 B1 | 7/1997 |
| EP | 1284805 B1 | 3/2009 |

* cited by examiner

DEVICE AND METHOD FOR TREATING A GAS LADEN WITH POLLUTANTS

BACKGROUND OF THE INVENTION

The invention relates to a device for treating a gas laden with pollutants, comprising at least one adsorption module for adsorbing the pollutants, which is utilized in an adsorption apparatus and contains at least one electrically conductive layer of an activated carbon fiber mat, comprising an electric current circuit for heating the activated carbon fiber mat for the desorption of the adsorbed pollutants, and comprising a distributing pipe, which is routed into the center of the adsorption module and has outlet openings, for a flush gas for inertizing and rinsing the activated carbon fiber mat.

The invention also relates to a method for treating a gas laden with pollutants, wherein the gas is applied to at least one adsorption module, which comprises an activated carbon fiber mat or an activated carbon fiber wrap-around, within an adsorption apparatus, the gas is uniformly distributed along the axial length of the module, whereby the pollutants are adsorbed on the activated carbon fibers and, after having been charged with pollutants, the activated carbon fibers are regenerated by heating the activated carbon fibers by conducting an electric current therethrough, and the pollutants are subsequently flushed out of the activated carbon fibers using an inert flush gas.

The prior art has long included adsorbing pollutants in gases on activated carbon and regenerating this activated carbon for a new adsorption process. The activated carbons utilized for this purpose are primarily in the form of fillings made of granulates in fixed beds, or activated carbon fibers in the form of nonwoven fabrics, woven fabrics, or knitted fabrics.

DE 100 32 385 A1 describes a method for regenerating electrically conductive adsorbents laden with organic substances, which are heated by conducting electric current therethrough. The adsorbent is heated, alternately and in temporal succession, by conducting electric current therethrough, with no flush gas conducted through the adsorbent and, subsequently, with the electric current switched off, a flush gas is conducted through the adsorbent, by way of which, the adsorbed organic substances are expelled and the adsorbent is simultaneously cooled.

The prior art also includes a method for adsorption and regeneration using an adsorption unit, which includes at least one activated carbon fiber element, wherein the activated carbon fiber element is heated by current flow (EP 1 284 805 B1). The activated carbon fiber element is designed in such a way that the activated carbon fiber element forms a sufficient electric resistance for heating. A gas flow is conducted into the heated activated carbon fiber element in order to selectively adsorb at least one component of the gas flow. An adsorbed component is desorbed in the presence of an inert gas flow by means of the control or regulation of the temperature of the activated carbon fiber element to a temperature for the desorption using an electric current flow. The adsorption system for the method comprises a hollow housing in which at least one elongate, annular activated carbon fiber element is disposed, which has a ratio of length to cross section that is sufficient for achieving an electric resistance for heating, and includes an electric connection to the activated carbon fiber element and gas connectors for the inflow and outflow of the gas, into and out of the hollow housing, wherein the gas connectors are disposed in such a way that the gas is directed into the hollow activated carbon fiber element, penetrates therein, and flows through the volume.

In addition, EP 0 532 814 B1 describes a device for treating a fluid having at least one constituent contained therein. This known device has a structure made of an adsorbent material to be traversed by a flow of the fluid so as to adsorb the adsorbable constituent by the adsorbent, wherein the structure is disposed in a treatment vessel. The device comprises means for periodically regenerating the adsorbent material by the Joule-Thomson effect, wherein means are used for cooperating with the structure during a desorption phase consisting of passing an electric current through at least one of the layers of the structure. The structure comprises layers, which are superimposed in a zigzag shape, of connected, electrically conductive activated carbon, which is obtained by weaving electrically conductive fibers. The layers are spaced apart from each other, so that turbulences are generated when the fluid to be treated flows therethrough. The electric current flows through the fibers in the fiber direction (longitudinally) by way of the potential difference being applied at the ends of the layers made of activated carbon or at the ends of each layer. The gas to be treated is fed through a perforated pipe and into the layer wound around the pipe.

In addition, DE 41 04 513 C2 describes an adsorber made of adsorbent material, which is electrically conductive and can be heated by means of electric current to a temperature at which the adsorbent material is cause to desorb. Pressed or fibrous activated carbon, which is present in the form of tubes, hollow fibers, or mats, through which the pollutant-laden fluid can flow, is used as the adsorbent, electrically conductive material. The tubes, hollow fibers or mats are clamped, at the end faces thereof, between two electrodes, and current flows through them in the longitudinal direction thereof.

U.S. Pat. No. 4,737,164 A describes a method for recovering volatile impurities from gases, wherein the gas flows through an activated carbon fiber fabric, which is rolled up and is heated by means of a DC current in order to increase the adsorption capacity thereof, and for desorption. The rolled-up activated carbon fiber fabric is connected, on the end face thereof, to an electrode, which is connected to the DC voltage source.

In addition, DE 698 27 676 T2 describes an electrically regenerable air filter medium, which contains:
   (A) an electrically conductive filter medium comprising a carbon fiber composite molecular sieve for the adsorption of impurities from a non-acceptable, inflowing air flow, and permitting the outflow of an acceptable air flow, wherein the filter medium made of a carbon fiber composite molecular sieve is an activated carbon fiber composite material, which further contains multiple porous carbon fibers, which are bound, by means of a carbonizable organic binding agent, in an open, permeable structure, and wherein the composite material has a porosity, before activation, in the range of approximately 82-86% and a surface area of more than 1000 $m^2/g$;
   (B) a regenerating means comprising a generator for electric current, which causes electric current to flow through the filter medium in order to desorb the adsorbed impurities from the filter medium; and
   (C) an encapsulation means for conducting the desorbed impurities away from the acceptable air.

All these known solutions have the disadvantage that electric current is applied to the activated carbon fibers along the longitudinal extension thereof (fiber axes), by way of which a non-uniform heating of the activated carbon fibers is induced along the axial length thereof in the adsorber module, and therefore the desorption of the pollutants from the activated carbon fibers is adversely impacted and can even remain incomplete. Adsorber modules having mats, hollow fibers, or tubes of activated carbon fibers utilizing electric regeneration have therefore not proven to be successful so far.

In addition, these adsorber modules having hollow fibers, tubes or wrapped-around mats made of activated carbon fibers induce a different pressure distribution of the gas along the axial length thereof, which results in a non-uniform flow profile and a non-uniform charging, having areas of local saturation, thereby resulting in a poor ratio of adsorber surface available to be traversed by flow and the adsorber surface area actually traversed by flow.

In addition, electrostatic discharges occur while the pollutant-laden gas flows through the mats, hollow fibers, and tubes made of activated carbon fibers, which results in the danger that uncontrolled electric shocks and discharges can cause fires and endanger the safety of the adsorption system.

Moreover, the hollow fibers, tubes, and wrapped-around mats made of activated carbon fibers do not have sufficient mechanical stability and are not easy to handle for purposes of maintenance and replacement. The known adsorber modules therefore tend to be susceptible to interference, and have an unsatisfactory efficiency and, therefore, are ultimately non-cost-effective.

SUMMARY OF THE INVENTION

With this prior art, the object of the invention is to provide a device and a method for treating a gas laden with pollutants, wherein the activated carbon fibers or activated carbon fiber mats can be heated to the desorption temperature uniformly along the axial length thereof in the module, a uniform pressure distribution is achieved during the radial flow of the gas therethrough, and the mechanical stability of the activated carbon fiber mats is increased while, simultaneously, the efficiency, safety, and cost-effectiveness are improved.

The solution according to the invention is based on the finding of applying an electric current to the activated carbon fiber layer or mat, transversely to the longitudinal extension thereof, in order to achieve a uniform heating along the axial length of the module, and of bringing the direction of the electric current flow in alignment with the direction of the gas flow from the inside to the outside, whereby a uniform pressure distribution during the flow is simultaneously ensured, in order to uniformly charge and desorb the activated carbon fiber mat or wrap-around.

This is achieved in that the adsorption apparatus comprises at least one activated carbon fiber module, which is formed, on the gas inflow side, of an inner layer, which is provided with gas inlet openings and is made of an electrically conductive material and, on the gas outflow side, is formed from an outer layer, which is provided with gas outlet openings and is made of an electrically conductive material, and is formed from an activated carbon fiber mat, which is held in the compressed state by the inner and the outer layers, wherein the outer layer has a larger free flow cross section for the gas as compared to the inner layer, and the inner and the outer layers are electrically insulated with respect to one another and are connected to a voltage source, wherein the inner and the outer layers, together with the activated carbon fiber mat or wrap-around, form the current circuit, in which current flows through the activated carbon fibers transversely to the direction of the activated carbon fibers, and the activated carbon fibers are connected as resistance.

According to one particularly preferred embodiment of the device according to the invention, the activated carbon fiber module comprises:

a) as the inner layer, an inner cylindrical hollow body, which comprises the electrically conductive material and is provided with openings, which are uniformly distributed over the outer surface of the hollow body for the free passage of gas transversely to the longitudinal axis of the hollow body, and which have a flow cross section of 5% to 80% of the area of the outer surface;

b) as the activated carbon fiber mat, at least one activated carbon fiber wrap-around disposed around the inner hollow body;

c) as the outer layer, a cylindrical hollow body, which surrounds the activated carbon fiber wrap-around on the outside and comprises the electrically conductive material, and is provided with openings, which are uniformly distributed over the outer surface of the hollow body for the free passage of gas transversely to the longitudinal axis, and which have a flow cross section of 50% to 95% of the area of the outer surface of the hollow body, wherein the activated carbon fiber wrap-around is held between the inner and the outer hollow bodies in a radially compressed, impervious, electrically conductive state; and d) an electrical insulation of the inner and the outer hollow bodies, wherein the inner hollow body and the outer hollow body are connected to the voltage source and, together with the activated carbon fiber wrap-around, form the current circuit, in which current flows through the activated carbon fiber wrap-around transversely to the direction of the activated carbon fibers, and the activated carbon fiber wrap-around is connected as resistance.

In one advantageous embodiment of the device according to the invention, the inner and the outer layers or the inner and the outer hollow bodies can comprise a thin, metallic, slot-, sieve-, perforated plate- or grating-like material, which, depending on the pollutants adsorbed on the activated carbon fibers, is selected from the group consisting of copper, aluminum and alloys thereof, iron or unalloyed steels, stainless steels, nickel-based alloys (Hastelloy), titanium or titanium alloys.

According to one further preferred embodiment of the device according to the invention, it is provided that the inner and the outer layers or the inner and the outer hollow bodies of the module are electrically non-conductively fastened on a holder or accommodating base in the adsorption apparatus. This ensures that the inner and the outer layers or the inner and the outer hollow bodies are electrically insulated with respect to one another.

It is particularly significant that the inner layer or the inner hollow body comprises a connector for the positive pole or negative pole, and the outer layer or the outer hollow body has a connector for the negative pole or the positive pole of the voltage source, wherein the voltage source is a DC voltage source, the potential difference of which, between the negative pole and the positive pole, is selected between 10 V and 400 V, depending on the thickness of the activated carbon fiber mat or activated carbon fiber wrap-around, and depending on the desorption temperature of the adsorbed pollutants on the activated carbon fibers.

The inner and the outer layers or the inner and the outer hollow bodies can also comprise connectors for an AC power source, the voltage and frequency of which are selected depending on the thickness of the activated carbon fiber mat or activated carbon fiber wrap-around, and depending on the desorption temperature of the adsorbed pollutants.

Depending on the type of activated carbon fiber mats or wrap-arounds, the modules according to the invention can be easily adapted to different pollutants, such as nonpolar substances, such as, for example, aromatic compounds, esters, paraffin hydrocarbons, halogen hydrocarbons, etc.

In one further preferred embodiment of the device according to the invention, the outer hollow body for the radial compression of the activated carbon fiber wrap-around has an inner diameter that is 0.01-fold to 0.4-fold smaller than the outer diameter of the wrapped-around layer of the activated carbon fiber mat. This makes it possible to keep the activated carbon fiber wrap-around in an impervious, electrically conductive state without substantial hollow spaces forming between the wrapped-around layers.

It is also advantageous that the connectors are connected to the DC or AC power source via connection lines, which are self-supporting and are routed through a base of the adsorption module or through a base plate of the inner hollow body of the activated carbon fiber module and the vessel casing of the adsorption apparatus in a gas- and pressure-tight and electrically insulated manner, wherein, as the pollutant-laden gas flows therethrough, the connection lines are connected via switches to the ground connection of the adsorption apparatus during the adsorption of the pollutants on the activated carbon fibers in order to bleed off an electrostatic discharge, and are electrically disconnected from the ground connection via the switches during the desorption of the adsorbed pollutants.

This is important in order to protect the module according to the invention against electrostatic discharges, flashovers, and even fires.

In one further preferred embodiment of the invention, the outer hollow body of the activated carbon fiber module can be surrounded by an inductor, which is connected to the AC power source, in order to generate a high frequency magnetic field for heating the activated carbon fiber wrap-around.

With respect to the adsorption capacity, it is particularly significant that the activated carbon fiber mat or activated carbon fiber wrap-around is formed from an activated carbon fiber fabric having a fiber diameter of 6 μm to 50 μm, a fiber length of 3 mm to 150 mm, and is formed from 3 to 300 layers. Given that the gas flow is the same from the inside toward the outside, or vice versa, during adsorption and desorption, better use is made of the adsorption surface area during the adsorption and desorption, and the desorption is more complete and efficient due to the more uniform heating. It has been shown that the large number of micropores of the activated carbon fibers results in a substantial increase in the mass-transfer rate, and therefore only a few layers of the activated carbon fiber fabric are needed in order to achieve a high adsorption capacity, given low partial pressures for the gas to be treated.

In one further preferred embodiment of the invention, it is provided that the activated carbon fiber module has an axial length that corresponds to the manufactured width of a commercially available activated carbon fiber fabric, by way of which it is possible to make full use of the activated carbon fiber fabric without significant waste.

Without departing from the invention, a plurality of wrap-arounds having manufactured widths can be joined to one another, wherein uncontrolled, non-uniform gas flow at the abutting edges thereof is prevented by means of a strip, and which, together, have an axial length that corresponds to the product of the manufactured width and the number of joined wrap-arounds having manufactured widths. In this way, activated carbon fiber modules can be provided, which have different axial lengths according to the particular application at hand.

In the case of small manufactured widths of the activated carbon fiber fabric (less than 200 mm), the activated carbon fiber modules having different axial lengths, as is the case with a filter candle, can be provided with at least two, and preferably three to eight layers of activated carbon fibers wrapped in a crisscrossed manner around the inner hollow body.

It is also advantageous that the activated carbon fiber mat held between the hollow bodies can be replaced, and therefore a new activated carbon fiber wrap-around can be installed on the activated carbon fiber module as necessary.

This results in the possibility of switching the activated carbon fiber module to another activated carbon fiber wrap-around both with respect to the fiber diameter and the specific adsorption surface area thereof.

In a further preferred embodiment of the invention, the distributing pipe for the flush gas is disposed on the longitudinal axis of the adsorption module or the activated carbon fiber module, and therefore the flush gas can be directed onto the inner hollow body through the outlet openings in the distributing pipe, uniformly distributed along the axial length of the activated carbon fiber module, in order to apply flush gas uniformly to the activated carbon fiber wrap-around and remove the desorbed pollutants from the module.

In one preferred embodiment of the invention, the adsorption module, in terms of a geometric area, consists in each case of two sandwich plates, which are slanted outward relative to the base, are gas permeable, are formed from the inner layer, which is made of electrically conductive material and is provided with gas inlet openings on the gas-inflow side, and from the activated carbon fiber mat, and the outer layer, which is made of electrically conductive material and is provided with gas outlet openings on the gas-outflow side, the sandwich plates being fastened, at the bottom, to the base and, at the top, to the holder of the adsorption apparatus in a pressure- and gas-tight and electrically non-conductive manner, and enclosing a treatment section, which is designed as a three-dimensional, closed trapezoid and in which the distributing pipe for the flush gas is routed along the longitudinal axis of the adsorption module up to close to the base of the adsorption module.

Furthermore, according to the invention, in the case of very high gas throughput rates, a plurality of adsorption modules can be disposed horizontally in a row in the gas flow, but in parallel, in an adsorption apparatus, which is designed as a three-dimensional, closed parallelogram, wherein the gas inlet connection piece is disposed above the adsorption modules on an end face of the adsorption apparatus, the gas outlet connection piece is disposed under the adsorption modules on the other end face of the adsorption apparatus, and the outlet connection piece for the desorbate is disposed at the lowest point on the vessel casing of the adsorption apparatus.

According to one particularly preferred embodiment of the invention, a plurality of activated carbon fiber modules is held in a triangular or quadrangular pitch on an accommodating base, which is oriented perpendicularly to the apparatus axis and is fastened in the adsorption apparatus in a gas- and pressure-tight and electrically non-conductive manner, wherein the inner and the outer hollow bodies of the activated carbon fiber modules are electrically insulated with respect to one another, and every inner hollow body encloses a treatment section in which the distributing pipe is routed along the longitudinal axis up to close to the base plate of the activated carbon fiber module in each case.

The entire adsorption apparatus can be designed horizontally or vertically using the corresponding modules. Without departing from the invention, it is also possible, in the case of very high gas throughput rates and activated carbon fiber modules having a limited length, to install the modules in a mirror-image arrangement in the adsorption apparatus, wherein the raw gas enters axially at both end faces of the adsorption apparatus and the purified gas exits in the center of the adsorption apparatus, preferably via two gas outlet connection pieces situated opposite one another, and the outlet connection piece for the desorbate is disposed on the vessel casing of the adsorption apparatus.

The object of the invention is also achieved by a method having the following steps of:
a) conducting the gas through an activated carbon fiber mat or activated carbon fiber wrap-around, which has been compressed by an inner, electrically conductive layer or an inner, electrically conductive hollow body and by an outer, electrically conductive layer or an outer, electrically conductive hollow body, wherein the outer layer has a free flow cross section, transverse to the longitudinal axis, for the gas, which is larger than that of the inner layer, or the outer hollow body has a free flow cross section, transverse to the longitudinal axis, for the gas, which is larger than that of the inner hollow body,
b) forming a current circuit between the inner and the outer layers or the inner and the outer hollow bodies, in which current flows radially through the activated carbon fiber mat or the activated carbon fiber wrap-around, transversely to the direction of the activated carbon fibers, during heating for the purpose of desorbing the pollutants.

In one embodiment of the method according to the invention, it is provided that the free flow cross section of the layers or hollow bodies increases, from 102% to a maximum of 300%, from the inside to the outside.

In one preferred embodiment of the method according to the invention, an adsorption module comprising sandwich plates or, preferably, an activated carbon fiber module can be used as the adsorption module, to which DC current or low-frequency AC current is applied.

According to a further preferred embodiment of the method according to the invention, the activated carbon fiber module is manufactured using the following steps of:
a) rolling and joining a thin, metallic, slot-, sieve-, perforated plate- or grating-like material to form an inner and an outer cylindrical hollow body having different diameters, which are matched to one another, as the inner and the outer layers of the activated carbon fiber module;
b) wrapping the inner hollow body with at least one wrap-around layer made of an activated carbon fiber mat and fastening the wrap-around layer, wherein the manufactured width of the activated carbon fiber mat determines the axial length of the activated carbon fiber module; and
c) radially compressing the activated carbon fiber wrap-around by axially sliding the outer hollow body onto the activated carbon fiber wrap-around, wherein the outer hollow body has an inner diameter, which is 0.01-fold to 0.4-fold smaller than the outer diameter of the activated carbon fiber wrap-around, and therefore the activated carbon fiber wrap-around is radially compressed and is held in an impervious, electrically conductive state, also in the transverse direction of the fibers.

According to a further advantageous embodiment of the method according to the invention, copper, aluminum, magnesium and the alloys thereof, iron, unalloyed steels, stainless steels, nickel-based alloys (Hastelloy), titanium or titanium alloys are used as the thin, metallic material for the inner and outer layers of the sandwich module or the inner and outer hollow bodies of the activated carbon fiber module, depending on the type and concentration of the pollutant.

In an expedient, further embodiment of the method according to the invention, in order to inertize and subsequently regenerate the pollutant-laden activated carbon fibers in the modules, the adsorption apparatus is initially pressurized with nitrogen to an overpressure of 0.1 bar to 1.0 bar and is subsequently depressurized, the pressurization and depressurization is then repeated multiple times until the oxygen content in the adsorption apparatus has dropped to <5%, and the module is then rinsed with a flush gas in order to desorb the pollutants from the activated carbon fibers and is heated to the desorption temperature by switching on the current circuit, wherein the rinsing and heating can also be carried out in several intervals.

Inert gas, preferably nitrogen, is used as the flush gas.

With respect to the efficiency of the method according to the invention, it is significant that whether the flow direction of the adsorption or desorption is the same or opposed is inconsequential, due to the electrical regeneration. Given that the electric current does not flow through the activated carbon fiber mat or the activated carbon fiber wrap-around in the longitudinal direction thereof, but rather in the transverse direction, a more uniform heating of the activated carbon fiber mat can be achieved. In other words, the thickness and not the length of the activated carbon fiber mat determines the electric resistance.

Further advantages and details will become apparent from the description that follows, with reference to the attached drawings.

BRIEF DESCRIPTION OF THE DRAWINGS

The invention is described in greater detail in the following with reference to several exemplary embodiments, wherein.

DETAILED DESCRIPTION OF THE INVENTION

Example 1

Figure 1:
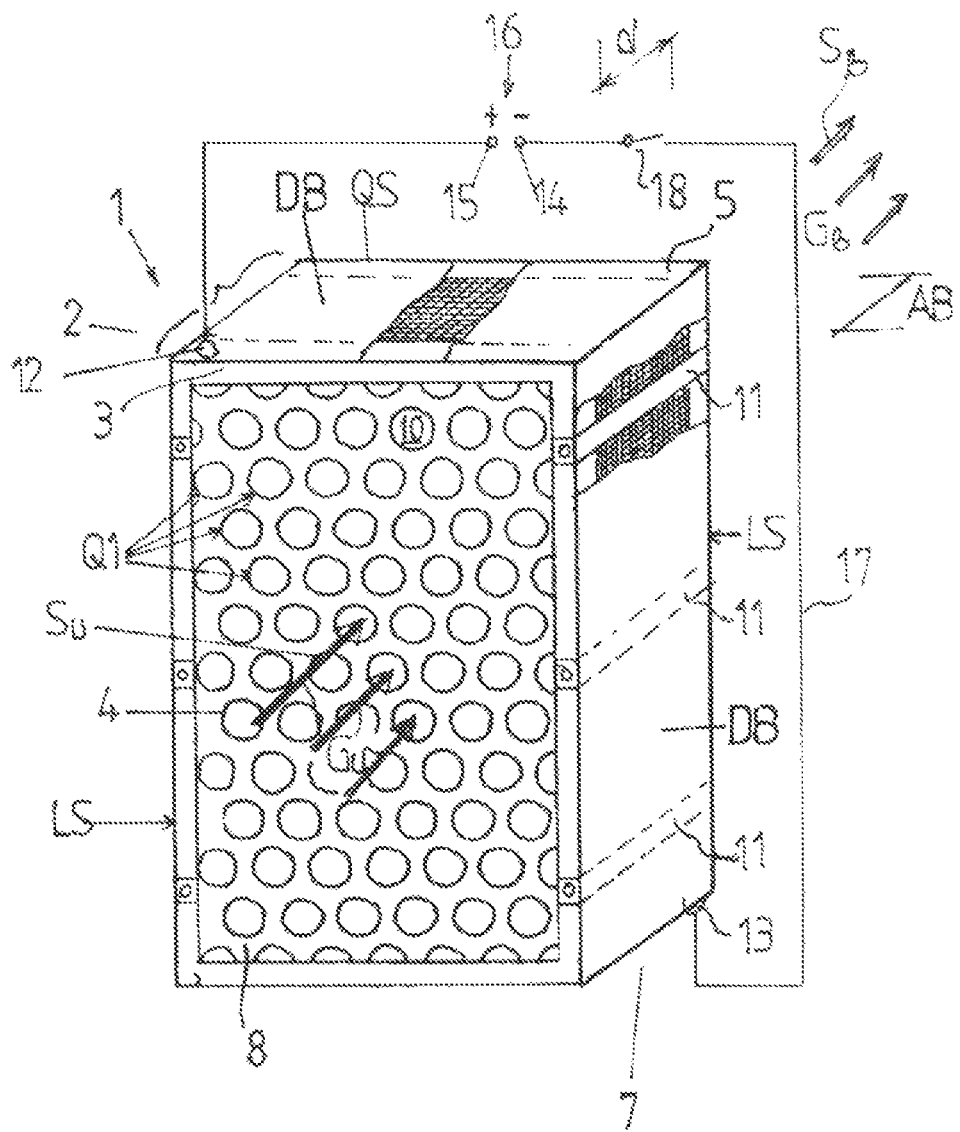
FIG. 1 shows a perspective view of the adsorption module in the embodiment of a sandwich plate from the gas inlet side.
Figure 2:
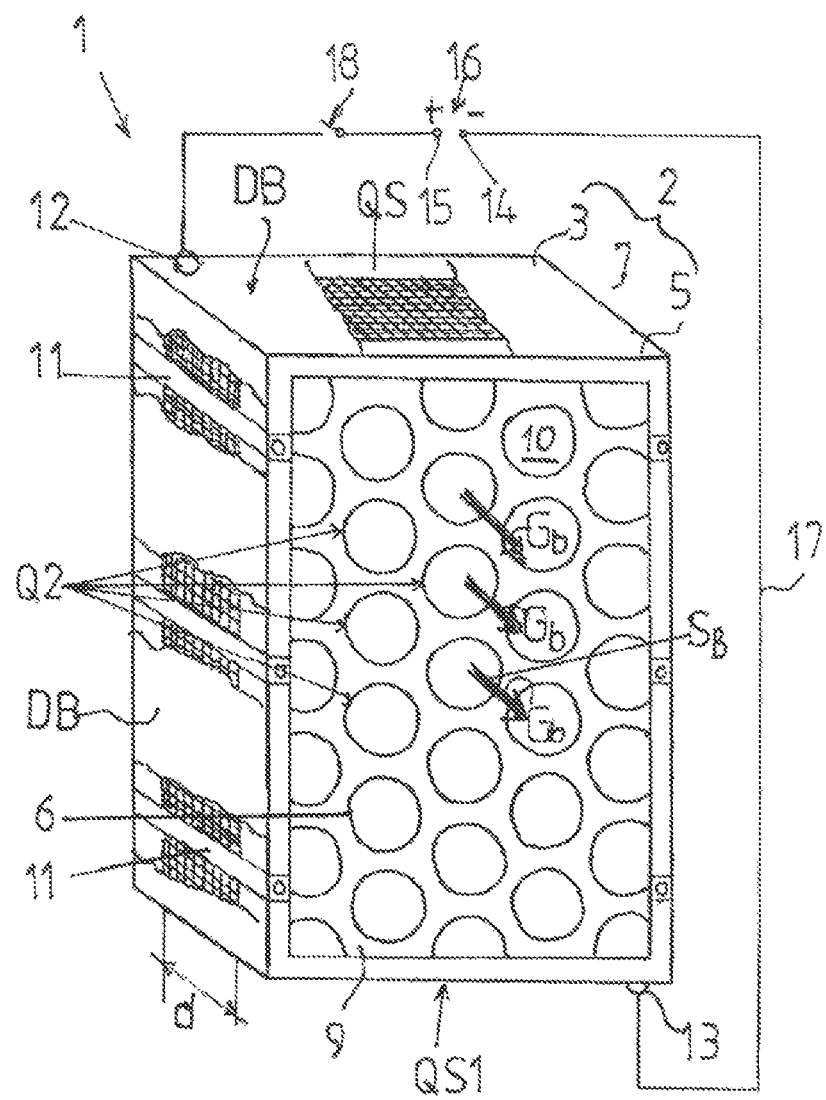
FIG. 2 shows a perspective view of the adsorption module in the embodiment of a sandwich plate from the gas outlet side.

FIGS. 1 and 2 show a perspective view of an adsorption module 1 in the form of a sandwich plate 2. The sandwich plate 2 comprises a thin, inner layer 3 made of an electrically conductive material having gas inlet openings 4, a thin, outer layer 5 made of an electrically conductive material having gas outlet openings 6 (see FIG. 2), and an activated carbon fiber mat 7, which is disposed between the inner layer 3 and the outer layer 5 and is held by these layers in a compressed, electrically conductive state. The inner layer 3 and the outer layer 5 each comprise a perforated plate 8 and 9, respectively (see FIG. 2).

The longitudinal sides and end faces of the sandwich plate 2 are closed in a gas-tight manner by cover plates DB.

The inner perforated plate 8 has a free flow cross section Q1 for the untreated gas into the activated carbon fiber mat 7 that results from the sum of all gas inlet openings 4 in the perforated plate 8. The outer perforated plate 9 likewise has a free flow cross section Q2 that results from the sum of all gas outlet openings 6 in the perforated plate 9.

The free flow cross sections Q1 and Q2 are obtained by introducing slots or holes 10 into the surfaces of the perforated plates 8 and 9, wherein the free flow cross section Q1 of the inner surface 5 is up to 80% of the surface of the perforated plate 8, and the free flow cross section Q2 of the outer surface of the perforated plate 9 is 50% to 95%, i.e., the free flow cross section increases from the inside toward the outside.

The inner and the outer perforated plates 8 and 9, respectively, have a material thickness that is dependent on the charging and the mechanical stability of the modules and comprises an electrically conductive material, preferably copper. The material can also be selected from the group consisting of aluminum, magnesium or the alloys thereof, iron, unalloyed steel, stainless steel, nickel-based alloys (Hastelloy), titanium or titanium alloys, depending on the pollutants to be adsorbed on the activated carbon fibers.

The activated carbon fiber mat 7 comprises a plurality, for example, 3 to 300, preferably 150 layers of an activated carbon fiber fabric, nonwoven fabric, knitted fabric, or felt, which can be present, for example, in a thickness of 100 mm, having a fiber diameter of 6 μm to 50 μm, a specific adsorption surface area of >600 m$^2$/g to >3000 m$^2$/g, and a manufactured width KB of 20 cm to 150 cm.

The inner and the outer perforated plates 8 and 9, respectively, between which the activated carbon fiber mat 7 is located, are held apart from one another at a distance AB by electrically non-conductive spacers 11, which are disposed along the longitudinal sides LS of the perforated plates 8 and 9 and each of which is fastened on the perforated plates.

Figure 6:
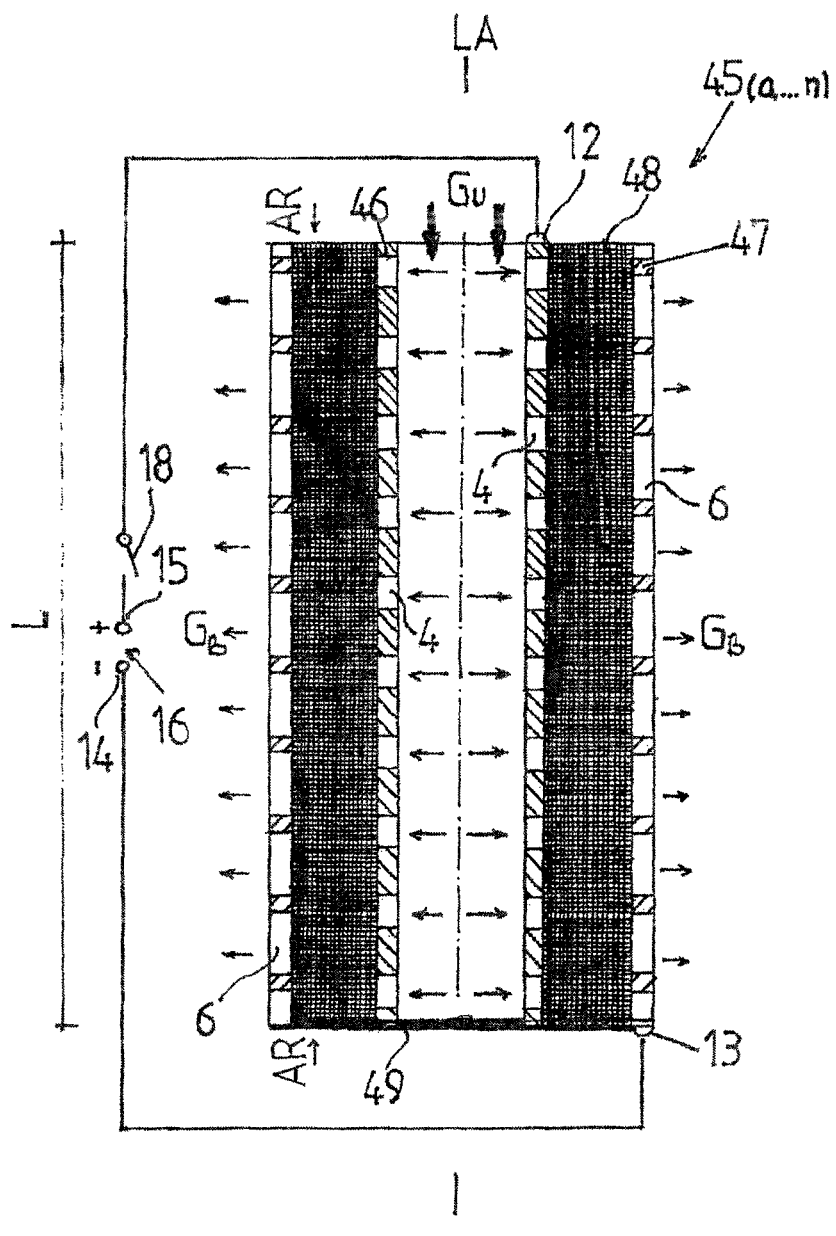
FIG. 6 shows a cross section along the line A-A from FIG. 5.

The distance AB is sized in such a way that it is approximately 0.01-fold to 0.4-fold smaller than the thickness d of the activated carbon fiber mat 7, and therefore the activated carbon fiber layers of the activated carbon fiber mat 7 are compressed during the manufacture (assembly) of the sandwich plate 2 to the extent that the activated carbon fibers touch each other in the longitudinal and transverse directions of the sandwich plate 2 and can also conduct the electric current transversely to the fiber direction AR (see also FIG. 6).

The inner perforated plate 8 comprises a connector 12 on the upper transverse side QS thereof, and the outer perforated plate 9 has a connector 13 on the lower transverse side QS1 thereof, opposite the transverse side QS of the inner perforated plate 8, wherein the connectors 12 and 13 or the connectors 14 and 15 are the connectors for the current (voltage) source 16, and therefore the inner perforated plate 8, the activated carbon fiber mat 7, and the outer perforated plate 9 form, in the transverse direction, a current circuit 17, which can be switched on or off by way of a switch 18.

The current circuit 17 is designed for DC voltages and AC voltages of up to 400 V.

The flow direction $S_U$ of the gas to be treated and the flow direction $S_B$ of the desorption gas $G_b$ are marked in FIGS. 1 and 2 using arrows and have the same direction.

Figure 3:
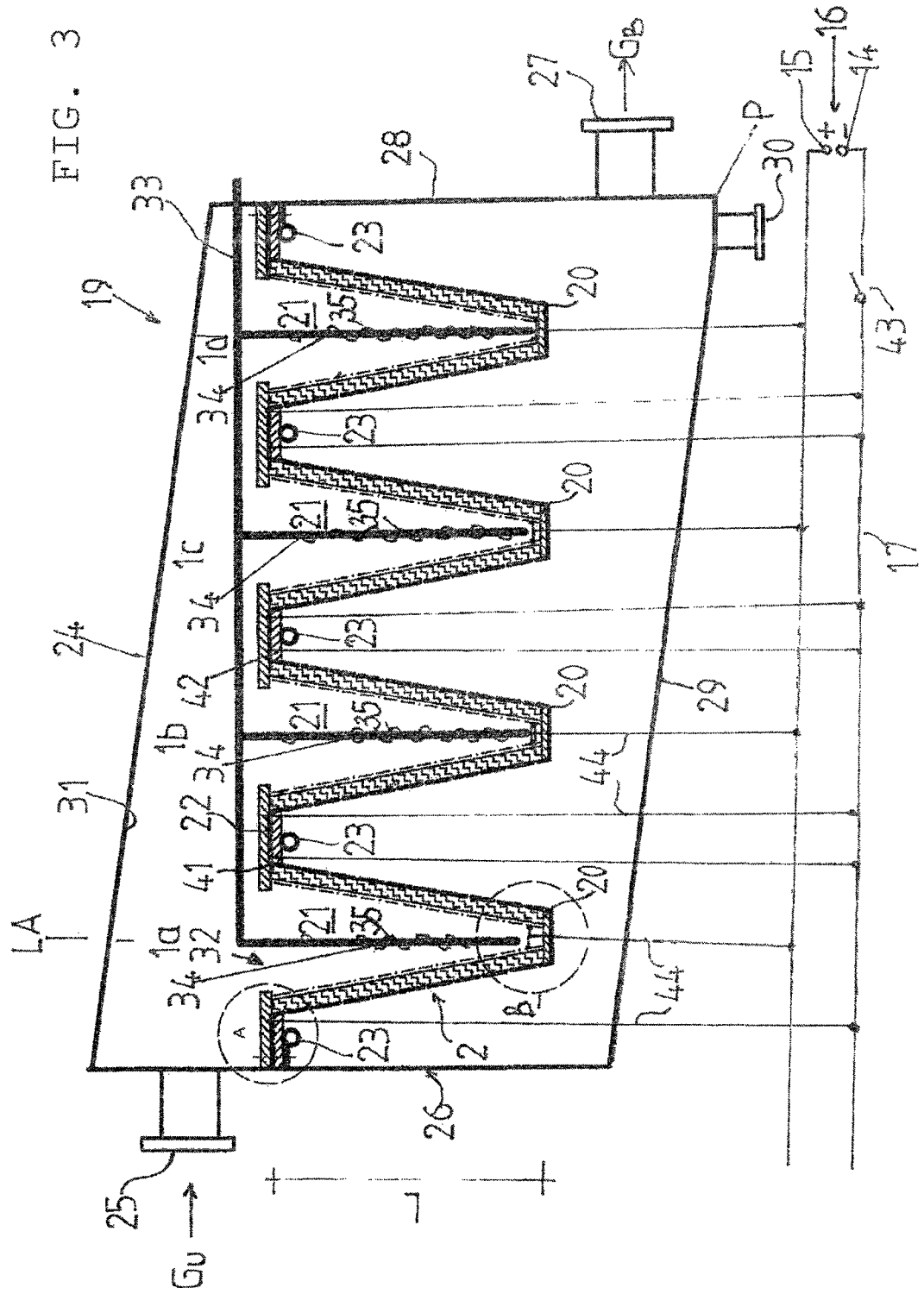
FIG. 3 shows a schematic depiction of the arrangement of adsorption modules, which comprise sandwich plates, of the device according to the invention in an adsorption apparatus.

Reference is now made to FIG. 3, which shows a plurality of adsorption modules $1_{(a \ldots n)}$, which are horizontally disposed one after the other in a row in an adsorption apparatus 19 and through which the gas flow flows in parallel. The adsorption modules $1_{(a \ldots n)}$ each comprise two sandwich plates 2, which are slanted outward relative to a base 20 and, together, delimit one trapezoidal, closed treatment section 21 having an axial length L. The outer perforated plates 9 of the two sandwich plates 2 are closed with respect to one another in a gas-tight manner on the bottom side by the base 20. The outer perforated plates 9 of the adsorption modules adjoining one another in the row, for example, the adsorption modules 1a and 1b, are connected to one another at the top by means of a connection plate 22, which rests, in an electrically insulated manner, on a holder 23 fastened in the adsorption apparatus 19.

The base 20 and the connection plate 22 comprise a thin material, which corresponds to the material of the perforated plate 9 that is utilized.

In a suitable manner, the two outer perforated plates 9 of each adsorption module $1_{(a \ldots n)}$ are welded to the base 20 on the bottom side, and the top-side connection plate 22 is welded to the outer perforated plates 9 of two adsorption modules adjoining one another in the row. It is also possible, of course, without departing from the invention, that the outer layer 5, i.e., the perforated plate 9, is provided in the form of a trapezoidal profile, the side walls of which are provided with the holes 10.

The adsorption apparatus 19 is designed as a three-dimensional parallelogram 24, wherein the gas inlet connection piece 25 for the pollutant-laden gas is located on an end face 26 of the adsorption apparatus 19 horizontally above the adsorption modules 1a to 1d disposed in a row. The gas outlet connection piece 27 is located under the adsorption module $1_{(a \ldots n)}$ that is above the lowest point P, at the other end face 28 of the adsorption apparatus 19.

An outlet connection piece 30 for the accumulating liquid or gaseous desorbate is disposed on the vessel casing 29 of the adsorption apparatus 19 at the lowest point P. The gas flow entering the adsorption apparatus 19 is deflected at the upper, inner vessel wall 31 of the three-dimensional parallelogram 24 in such a way that the untreated gas is directed, approximately vertically, into the treatment sections 21 through the inlet regions 32 of the adsorption modules $1_{(a \ldots n)}$. The gas then enters the activated carbon fiber mat 7, uniformly distributed, via the holes 10 or slots in the inner perforated plate 8, for adsorption of the pollutants, flows through the activated carbon fiber mat 7 transversely from the inside to the outside and exits the adsorption modules $1_{(a \ldots n)}$ via the holes 10 in the particular outer perforated plate 9 (see FIGS. 1 and 2).

A distributing pipe 34 for a flush gas, preferably nitrogen, is connected to a shared supply line 33, is routed into each treatment section 21 of the adsorption modules $1_{(a \ldots n)}$ disposed in a row, and extends along the longitudinal axis LA of the adsorption modules $1_{(a \ldots n)}$ up to close to the base 20. The distributing pipe 34 is closed at the end thereof and has outlet openings 35 for the flush gas, which are uniformly distributed over the outer surface thereof. This ensures that the flush gas is uniformly distributed onto the activated carbon fiber mat 7 and that the desorbed pollutants are flushed out evenly over the activated carbon mat 7.

The flow connector corresponds to the connector described in FIGS. 1 and 2.

Figure 4A:
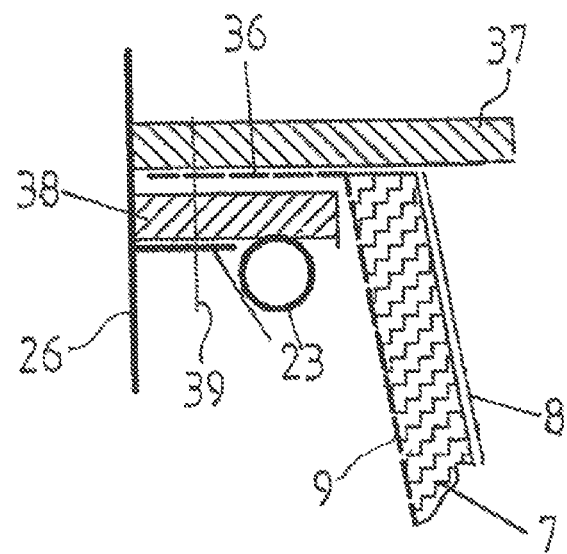
FIGS. 4a and 4b, which are details A and B, show the fastening and insulation of the sandwich plates in the adsorption apparatus.
Figure 4B:
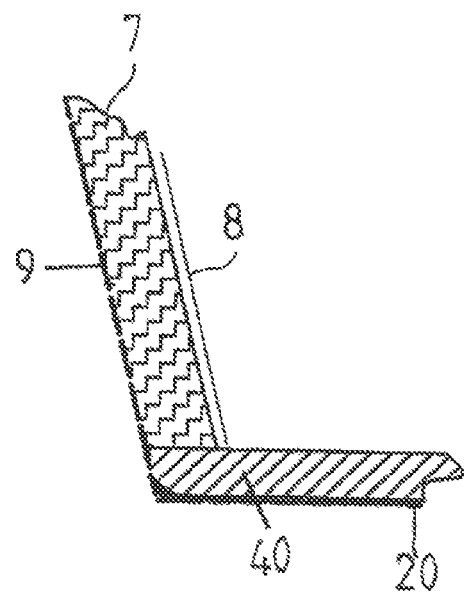
Figure 5:
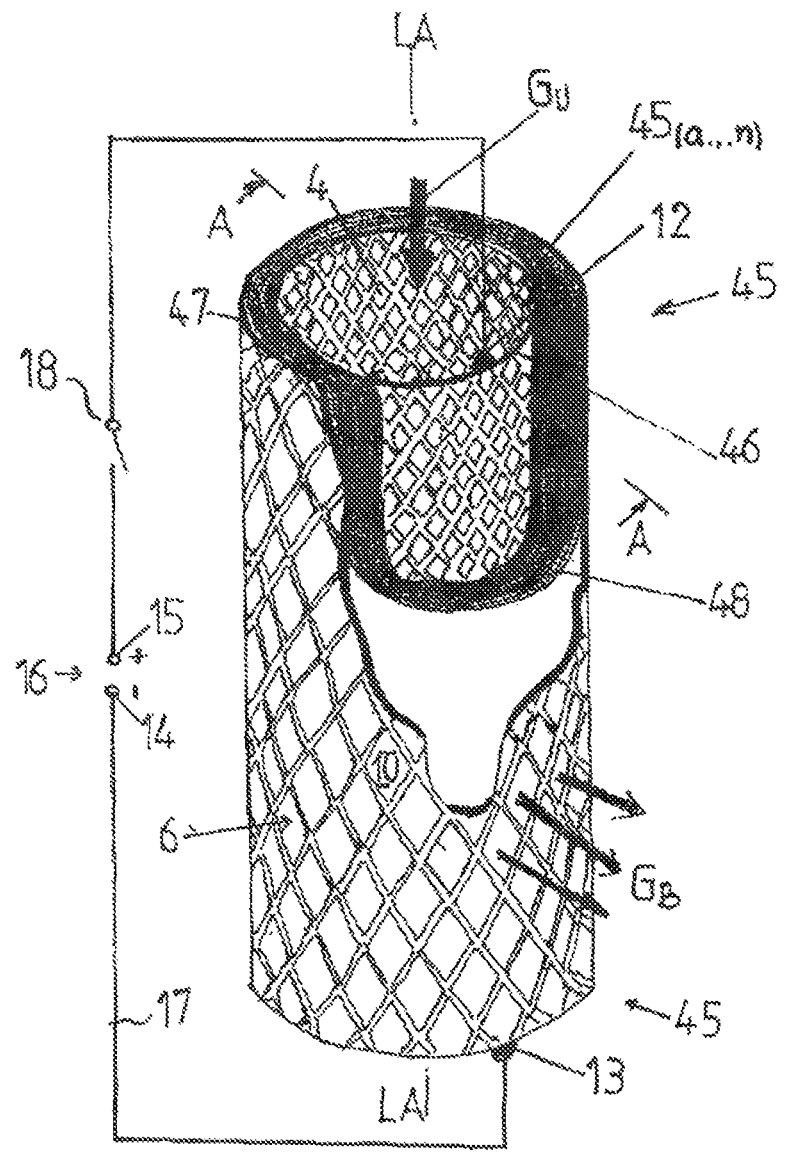
FIG. 5 shows a perspective view of the activated carbon fiber module.

FIGS. 4a and 4b show details of the electrical insulation of the inner and the outer perforated plates 8 and 9, respectively, with respect to one another, of activated carbon fiber modules and the fastening thereof in the adsorption apparatus 19.

The outer perforated plate 9, which faces the end face 26 of the adsorption apparatus 19, has, on the top side thereof, an outwardly curved leg 36, which is held between an upper, electrically non-conductive connection plate 37 and a lower insulation plate 38, for example, a Teflon or polyethylene plate, by means of a screw fitting 39, wherein the lower insulation layer 38 rests on the holder 23 fastened in the adsorption apparatus 19.

Disposed on the base 20 of each adsorption module $1_{(a \ldots n)}$ is a lower insulation plate 40, on which the inner perforated plate 8 having the activated carbon fiber mat 7 rests, on the end face thereof, and therefore the inner perforated plate 8 and the outer perforated plate 9 are electrically insulated with respect to each other. The insulation plate 40 is preferably made of Teflon or polyethylene.

The top-side connection plate 22 of the adjoining, outer perforated plates 9 is electrically insulated with respect to the inner perforated plate 8 by means of an upper insulation plate 41 and with respect to the holder 23 by means of a lower insulation plate 42 (see FIG. 3). An electric current in the current circuit 17 from the voltage source 16, which is applied at the connector 12 of the inner perforated plate 8 and at the connector 13 of the outer perforated plate 9, can therefore flow through the activated carbon fiber mat 7 only in the transverse direction, i.e., from the inside toward the outside, or vice versa. The potential difference between the poles 15 and 14, which is delivered by the voltage source 16, is selected depending on the thickness d of the activated carbon fiber mat 7, the required desorption temperature for the pollutants, and the concentration of the pollutants in the untreated gas. The potential difference can be between 10 V and 400 V.

The connectors 12 and 13 are connected to the voltage source 16 via a switch 43 by means of electrically non-insulated connection lines 44, which are routed, in a gas-tight manner, through the base 20 of the particular adsorption module $1_{(a \ldots n)}$ and the vessel casing 29 of the adsorption apparatus 19.

In the present example, the method according to the invention is implemented as follows. The untreated gas $G_u$, for example hexane-containing exhaust air, is fed to the adsorption apparatus 19 via the gas inlet connection piece 25 disposed in the horizontal flow direction above the adsorption modules $1_{(a \ldots n)}$, which are disposed in a row, and is directed into the particular treatment sections 21 of the adsorption modules $1_{(a \ldots n)}$. The untreated gas flows through the holes 10 of the inner perforated plate 8 into the pollutant-adsorbing activated carbon fiber mat 7 and exits this mat through the holes 10 of the outer perforated plate 9 as purified gas flow $G_B$. The adsorption therefore takes place, in the present example, from the inside toward the outside, transversely through the activated carbon fiber mat 7.

The total surface area of the activated carbon fiber mat 7 is selected depending on the pollutant concentration in the exhaust air and is approximately 9 m², given, for example, an air volume of 1000 m³/h, an operating pressure of 35 mbar, a temperature of +254° C., and a pollutant concentration of 100 mg/m³.

After the activated carbon fiber mat 7 has been charged, the supply of the untreated gas $G_u$ is interrupted by a non-illustrated valve and a switchover from adsorption to regeneration is implemented. For this purpose, flush gas, in the present example nitrogen having a maximum oxygen content of <5%, is conducted via the distributing pipe 34 into the center of each treatment section 21 and is uniformly distributed into the activated carbon fiber mat 7, and the adsorption apparatus is thereby inertized. The activated carbon fiber mat 7 is subsequently heated to the desorption temperature. The heating takes place electrically, i.e., the current circuit 17 comprising the inner perforated plate 8, the activated carbon fiber mat 7, and the outer perforated plate 9 is switched on, and therefore the current flows from the inner perforated plate 8 transversely through the activated carbon fiber mat 7 into the outer perforated plate 9. The level of the electric power is selected depending on the required desorption temperature for the pollutants and the concentration of the pollutants in the gas. Under the conditions of the present example, the level is approximately 5 kW.

Example 2

FIGS. 5 to 11 show perspective and schematic views of a particularly preferred embodiment of the adsorption module 45 in the form of the activated carbon fiber module $45_{(a \ldots n)}$ according to the invention. The activated carbon fiber module $45_{(a \ldots n)}$ comprises an inner cylindrical hollow body 46, an outer cylindrical hollow body 47, and an activated carbon fiber wrap-around 48 disposed between the inner hollow body 46 and the outer hollow body 47. The radial gas flow through the activated carbon fiber wrap-around from the inside toward the outside is depicted in FIG. 6.

The inner hollow body 46 and the outer hollow body 47 comprise electrically conductive material, preferably copper. Depending on the type and concentration of the pollutant in the untreated gas, the electrically conductive material for the hollow body 47 can also be selected from the group consisting of aluminum, magnesium or the alloys thereof, iron, unalloyed steel, stainless steel, nickel-based alloys (Hastelloy) or titanium or titanium alloys.

The dimensions of the inner hollow body 46 can be, for example, a wall thickness between 1 mm and 2.5 mm, a diameter of 80 mm to 600 mm, and a length of 1400 mm to 3000 mm.

The inner hollow body 46 is closed at the bottom in a pressure- and gas-tight manner by means of a base plate 49, which is welded to the casing 50 of the hollow body 46 on the bottom-side end face 51 thereof and therefore forms a treatment section 52 in the hollow body 46. The base plate 49 comprises a material that corresponds to the material of the inner hollow body 46.

On the top side, the outer hollow body 47 has an outwardly directed annular flange 53, which is fastened to the casing 54 of the outer hollow body 47 on the end face 55 thereof by means of a welded joint point. The annular flange 53 comprises a material that corresponds to the material of the outer hollow body 47. The activated carbon fiber module $45_{(a \ldots n)}$ is fastened by means of the annular flange 53 to an accommodating base 56 mounted in the adsorption apparatus 19 by means of an electrically non-conductive screw fitting.

Gas inlet openings 4 in the form of holes or slots 10, which are uniformly distributed over the casing surface, are introduced in the casing 50 of the inner hollow body 46. The free flow cross section Q1 of these holes 10 of the inner hollow body 46 transverse to the longitudinal axis LA thereof is between 5% and 80% of the casing surface.

An activated carbon fiber wrap-around 48 is disposed around the casing 50 of the inner hollow body 46 and, depending on the type and concentration of the pollutant in the gas, can comprise a plurality of wrap-around layers, for example 3 to 300 layers, preferably 150 layers, of an activated-carbon fiber fabric, nonwoven fabric, knitted fabric, or felt having a fiber diameter of approximately 6 μm to 50 μm and a manufactured width KB of 20 cm to 150 cm.

The outer hollow body 47, as is also the case with the inner hollow body 46, comprises an electrically conductive material that corresponds to that of the hollow body 47.

Gas outlet openings 6 in the form of holes, slots or gratings 10, which are uniformly distributed over the casing surface of the outer hollow body 47, are introduced into the casing 54 of the outer hollow body 47. The free flow cross section Q2 of these holes 10 in the outer hollow body 47 transverse to the longitudinal axis LA thereof is between 50% to 95% of the casing surface (see also FIGS. 1 and 2).

This means that the free flow cross section Q1 increases radially from the inside toward the outside to the flow cross section Q2.

The activated carbon fiber module $45_{(a \ldots n)}$ can be expediently manufactured in the following working steps of:
a) rolling and joining the thin, metallic, slot-, sieve-, perforated plate- or grating-like material to form an inner and an outer cylindrical hollow body 46 and 47, respectively, having different diameters, which are matched to one another, as the inner and outer layers of the activated carbon fiber module;
b) wrapping the inner hollow body 46 with at least one wrap-around layer 48 made of an activated carbon fiber mat and fastening the wrap-around layer, wherein the manufactured width KB of the activated carbon fiber mat determines the axial length L of the activated carbon fiber module; and
c) radially compressing the activated carbon fiber wrap-around 48 by axially sliding the outer hollow body 47 onto the activated carbon fiber wrap-around 48, wherein the outer hollow body 47 has an inner diameter ID, which is 0.01-fold to 0.4-fold smaller than the outer diameter AD of the activated carbon fiber wrap-around 48, and therefore the activated carbon fiber wrap-around 48 is radially compressed and is held in an impervious, electrically conductive state, also in the transverse direction of the fibers.

The inner hollow body 46 has a connector 12 on the top-side end face 55 thereof, and the outer hollow body 47 has a connector 13 on the bottom-side end face 51 thereof, wherein the connector 12 is connected to the connector 15, and the connector 13 is connected to the connector 14, and the connectors 14 and 15 are connected to the voltage source 16, and therefore the inner hollow body 46, the activated carbon fiber wrap-around 48, and the outer hollow body 47 form a current circuit 17, which can be switched on and off by means of a switch 18. The current circuit 17 is designed for DC voltages of 10 V to 400 V. It is also provided according to the invention to use a low-frequency AC current or a suitable current configuration instead of a DC current.

In addition, the outer hollow body 47 of the activated carbon fiber module $45_{(a \ldots n)}$ can be surrounded by a non-illustrated inductor, which is connected to the AC power source and heats the activated carbon fiber wrap-around 48 to the desorption temperature.

A distributing pipe 57 for an inert flush gas, for example nitrogen, plunges into the treatment section 52 of each activated carbon fiber module and is routed along the longitudinal axis LA of the activated carbon fiber module up to close to the base plate 49. The distributing pipe 57 is closed at the end thereof facing the base plate 49 and has outlet openings 58 for the flush gas, which are uniformly distributed over the casing surface of the distributing pipe. This ensures that the flush gas is uniformly distributed via the holes/slots 10 of the inner hollow body 46 into the activated carbon fiber wrap-around 48, and the desorbed pollutants are flushed out of the activated carbon fiber wrap-around 48 during the regeneration.

Figure 8A:
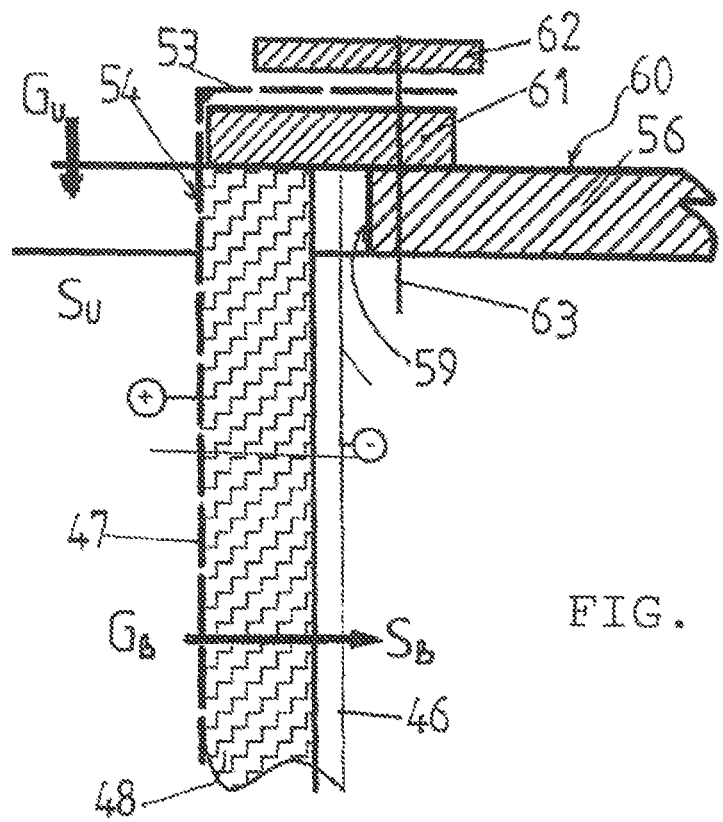
FIGS. 8a and 8b, which are details C and D, show the fastening and insulation of the hollow bodies of the activated carbon fiber module in the adsorption apparatus.
Figure 8B:
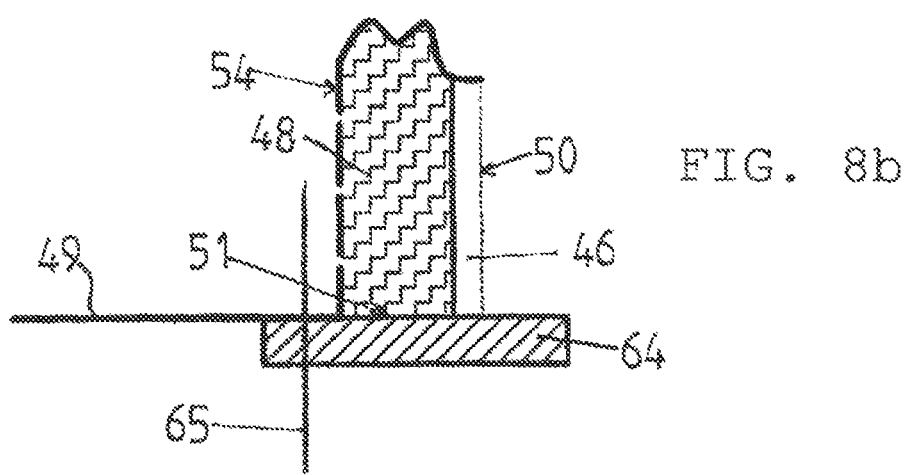

FIGS. 8a and 8b show details of the electrical insulation of the inner and the outer hollow bodies 46 and 47, respectively, with respect to one another, and the fastening thereof on the accommodating base 56 in the adsorption apparatus 19.

FIG. 8a shows the fastening of the outer hollow body 47 on the accommodating base 56, wherein at least one installation opening 59 is provided, in which the activated carbon fiber module $45_{(a \ldots n)}$ is mounted in such a way that the longitudinal axis LA of the activated carbon fiber module $45_{(a \ldots n)}$ extends at a right angle to the flow direction $S_u$ of the untreated gas $G_u$ and the annular flange 53 of the outer hollow body 47 is disposed on the side 60 of the accommodating base 56 facing the flow direction $S_u$. The electrically conductive annular flange 53 is located between a lower electrically non-conductive annular plate 61 made of Teflon or polyethylene and an upper, electrically non-conductive annular plate 62 made of Teflon or polyethylene. The upper annular plate 62, the annular flange 53, and the lower annular plate 61 are fastened on the accommodating base 56 by means of a screw fitting 63, close to the installation opening 59. The lower annular plate 61 is designed in such a way that the plate completely undergirds the electrically conductive annular flange 53 of the inner hollow body 46, and covers the activated carbon fiber wrap-around 48 and the upper end face 55 of the electrically conductive casing 54 of the outer hollow body 47, and therefore electrically insulates these with respect to one another.

FIG. 8b shows the electrical insulation of the electrically conductive casing 50 of the inner hollow body 46 and of the electrically conductive casing 54 of the outer hollow body 47. The electrical insulation comprises a base annular plate 64 made of Teflon or polyethylene, the annular surface of which covers the bottom-side end face 51 of the inner casing 50, the outer casing 54 and the activated carbon fiber wrap-around 48, and is fastened on the base plate 49 by means of a screw fitting 65.

Figure 7:
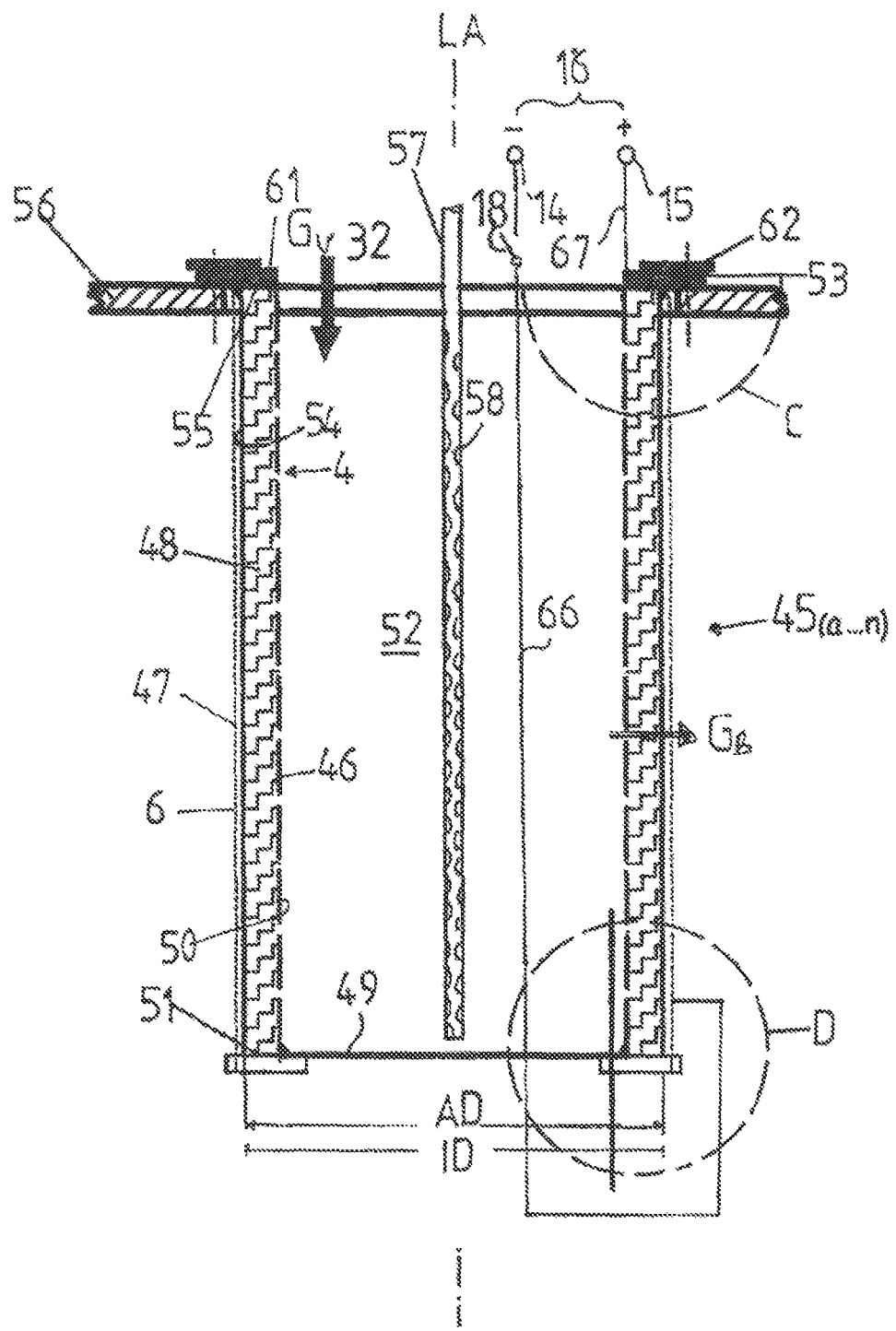
FIG. 7 shows a schematic view of the activated carbon fiber module of the device according to the invention in a sectional view, including insulation and an electrical connection to a voltage source.

Reference is made to FIGS. 6 and 7 once more. The connector 12 of the inner hollow body 46 and the connector 13 of the outer hollow body 47 are connected to the voltage source 16 by means of connection lines 66 and 67, wherein the connection line 66 is connected to the pole 14 and the connection line 67 is connected to the pole 15 of the voltage source 16.

The connection line 66 is routed in a gas-tight and electrically non-conductive manner through the base plate 49 and is disposed in a self-supporting manner in the treatment section 52 of the inner hollow body 46.

The voltage source 16 can be switched on or off using the switch 68.

Figure 9:
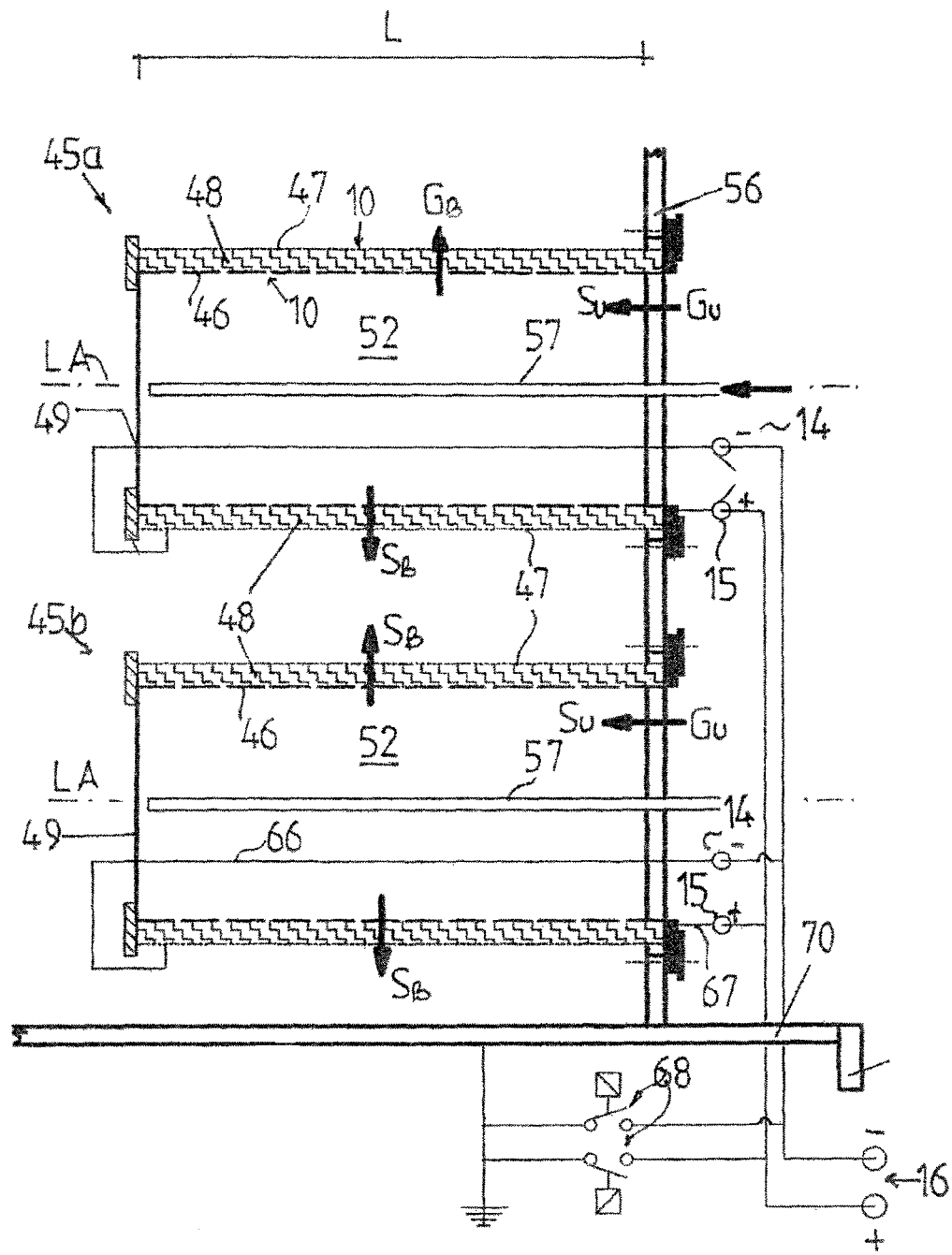
FIG. 9 shows a schematic depiction of the arrangement of activated carbon fiber modules on an accommodating base in an adsorption apparatus having electric connectors and potential equalization against electrostatic discharge, including the circuit during adsorption and desorption.

FIG. 9 shows, by way of example, two activated carbon fiber modules $45_a$ and $45_b$, which are disposed in the accommodating base 56 in a triangular or quadrangular pitch, and which are representative of a larger number of activated carbon fiber modules disposed in the accommodating base 56. The activated carbon fiber modules $45_a$ and $45_b$ are oriented at a right angle to the flow direction $S_u$ of the incoming, untreated gas $G_u$. The gas enters the treatment sections 52 defined by the inner hollow bodies 46, in the flow direction, and is uniformly conducted through the holes/slots 10 of the inner hollow body 46 along the axial length L of the particular activated carbon fiber module into the activated carbon fiber wrap-around 48. The pollutants in the gas are radially adsorbed on the activated carbon fibers during the flow through the activated carbon fiber wrap-around 48. The treated gas exits the activated carbon fiber wrap-around 48 through the holes/slot 10 of the outer hollow body 47.

The flow direction $S_U$ of the untreated gas $G_u$ and the flow direction $S_B$ of the desorption gas $G_b$ are marked in FIG. 9 using arrows.

Electrostatic discharges can occur during the flow of the pollutant-laden gas through the treatment section 52, which renders a potential equalization necessary. The potential equalization is achieved by way of connecting the connection lines 66 and 67 to the ground connection of the adsorption apparatus 70 via the switch 68, whereby the activated carbon fiber modules $45_a$ and $45_b$ are disconnected from the ground connection during the desorption, since only inert flush gas, for example nitrogen, flows through the modules. After the desorption has concluded and the pollutants have been flushed out, the ground connection is closed, still under the flush-gas atmosphere, i.e., still before the beginning of adsorption, in order to bleed off an electrostatic discharge.

Figure 10A:
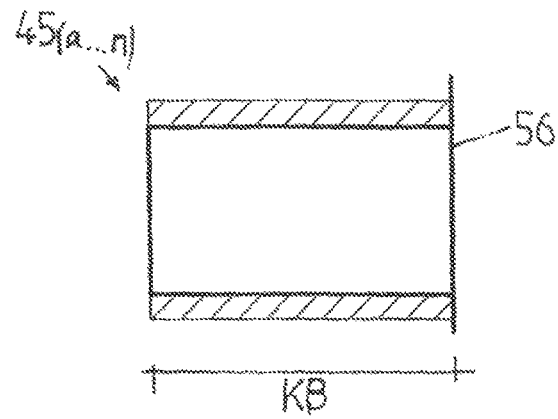
FIGS. 10a to 10c show variants of activated carbon fiber modules having different axial lengths.
Figure 10B:
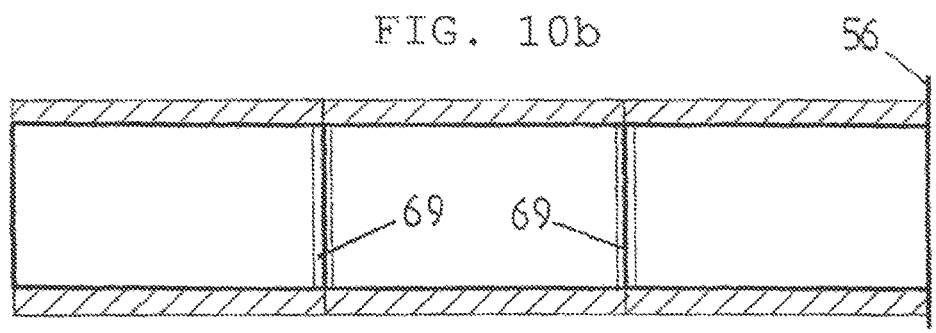
Figure 10C:
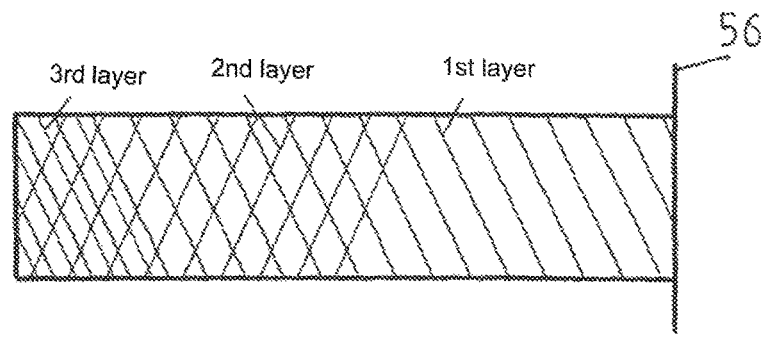

FIGS. 10a to 10c show variants of the arrangement of the activated carbon fiber wrap-around 48 in activated carbon fiber modules $45_{(a \ldots n)}$ having different axial lengths L. The axial length L of the activated carbon fiber module $45_a$ is expediently based on the manufactured width KB of the available activated carbon fiber fabric, nonwoven fabric, knitted fabric, or felt (see FIG. 10a).

For example, if axial lengths L of the activated carbon fiber modules $45_{(a \ldots n)}$ are required that are substantially greater than the manufactured width KB, several wrapped-around manufactured widths pushed next to one another can be joined to one another as one overall wrap-around, which, together, have an axial length L, which corresponds to the product of the manufactured width KB and the number of wrap-arounds joined to one another.

Uncontrolled and non-uniform gas throughput is prevented by means of a strip 69 disposed at the abutting edges.

If the axial length of the activated carbon fiber module is less than or greater than the manufactured width KB, as is the case with filter candles, at least two, and preferably more than three, crisscrossed layers of activated carbon fibers are wrapped around the inner hollow body 46 (see FIG. 10c).

Figure 11:
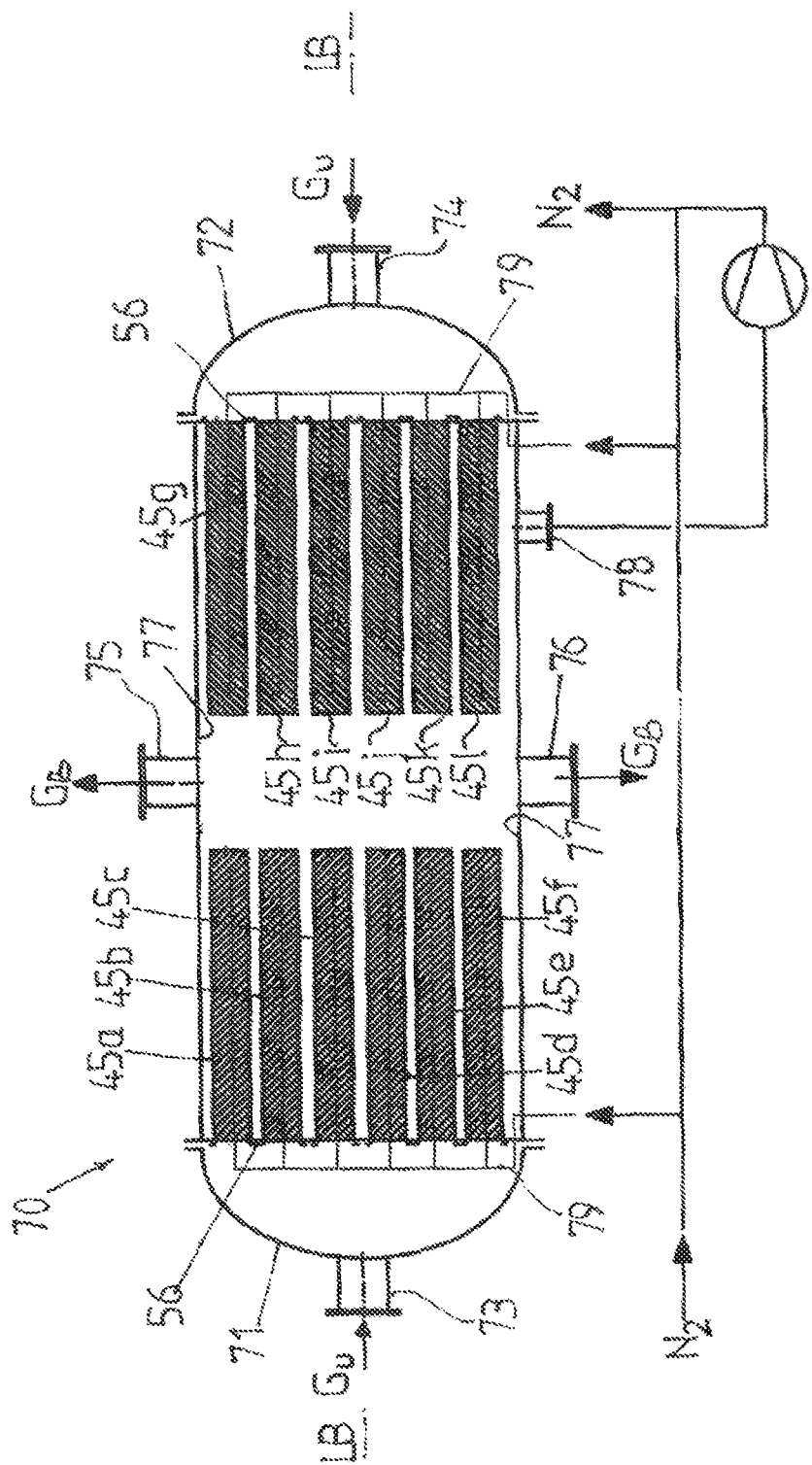
FIG. 11 shows a schematic view of an adsorption apparatus comprising activated carbon fiber modules for carrying out the method according to the invention.

FIG. 11 shows an adsorption apparatus 70 for high gas throughputs, having relatively short activated carbon fiber modules $45_{(a \ldots n)}$, in which, for example, two accommodating bases 56 are fastened. Each accommodating base 56 supports ten activated carbon fiber modules, which are disposed in a triangular or quadrangular distribution, of which, for example, the modules $45_{(a \ldots j)}$ are shown, the activated carbon fiber wrap-around 48 of which lies at a right angle to the flow direction of the untreated gas, which flows, in the direction of the activated carbon fiber modules $45_{(a \ldots j)}$, through each of the gas inlet connection pieces 73 and 74, which are disposed in the center in the vessel base 71 and 72, respectively, on the longitudinal axis LB of the adsorption apparatus 70. The gas outlet connection pieces 75/76 are disposed opposite one another in the center of the casing 77 of the adsorption apparatus 70. In this arrangement, it can be advantageous to conduct the flush gas, which is nitrogen in this case, in a larger quantity in the circuit and to supply or remove only small quantities of fresh flush gas (FIG. 11). The outlet connection piece 78 for the gaseous or liquid desorbate is located under the activated carbon fiber modules $45_{(a \ldots j)}$.

The flush gas, preferably nitrogen, is supplied to each distributing pipe 57 plunging into the treatment section 52 via a shared supply line 79, which extends through the casing 77 of the adsorption apparatus 70 in a pressure- and gas-tight manner. The electric current circuit 17 between the inner hollow body 46, the activated carbon fiber wrap-around 48, and the outer hollow body 47 corresponds to the description according to FIG. 5.

The method according to the invention, which is carried out in the adsorption apparatus 70, will be described in greater detail in the following, with reference to two further examples.

Example A

A solvent-processing operation has an exhaust-air purification unit, in order to remove solvents, which are used, for example, during the coating of foils, and to therefore purify the exhaust air. In addition, free emissions can occur in the production facility, which guarantees compliance with the maximum workplace concentration in the hall by way of exhaust units on the roof.

This exhaust air coming from the facility and the exhaust-air purification unit shall be purified or treated using the method according to the invention.

The following operating data apply:
Air volume: 20,000 m³/hour
Operating pressure: 30 mbar
Temperature: +25° C.
Pollutant in the air: Hexane
Pollutant concentration: 140 mg/m³.

The objective is to achieve a pollutant concentration of <50 mg/m³ in the purified exhaust air.

In the present example, the method according to the invention is carried out as follows. The untreated exhaust air is fed to the adsorption apparatus 70 via the gas inlet connection piece 73 in the horizontal flow direction.

The adsorption apparatus 70 has a diameter of 2.4 m and a length of 3 m. In the adsorption apparatus 70, there are 10 activated carbon fiber modules 45$_{(a \ldots j)}$ having an inner hollow body diameter of 400 mm and an axial length L of 1600 mm. The thickness d of the activated carbon fiber wrap-around 48 is 100 mm. For the purpose of adsorption, the activated carbon fiber modules 45$_{(a \ldots j)}$ are charged for a total of 6 hours and are regenerated for 4 hours. The regeneration is carried out electrically by way of the activated carbon fiber wrap-around 48 being heated. The amount of electric energy required is 4.0 kW per module and hour.

The desorption gas collected contains approximately 20 g/m$^3$ hexane, which can be fed into the available exhaust-air purification unit, which is required for the foil production.

Example B

Similar to the description in Example A, concentrated exhaust air containing other solvents, for example, benzene, toluene, dichloromethane, ethanol, to name only a few common pollutants, can also be prepared in a similar form. The residual concentrations achieved using the method according to the invention correspond to the current legal requirements, for example, 20 mg/m$^3$ or 50 mg/m$^3$.

Due to the electric regeneration of the activated carbon fiber wrap-arounds 48 from the inside toward the outside, and the associated concentration of the pollutant in the desorption gas of up to approximately 1:1000, it is possible to feed the desorption gas directly to a condenser and obtain the contained solvents in an anhydrous form. Non-condensable components are returned to the exhaust air downstream from the condenser.

The invention claimed is:

1. A device for treating a gas laden with pollutants, comprising at least one adsorption module for adsorbing the pollutants, the adsorption module being configured to be received in an adsorption apparatus and comprising at least one electrically conductive layer of an activated carbon fiber mat, an electric current circuit for heating the activated carbon fiber mat for the desorption of the adsorbed pollutants, and a distributing conduit coaxial with a center axis of the adsorption module and having axially spaced outlet openings for distributing a flush gas for inertizing and rinsing the activated carbon fiber mat, wherein the adsorption module comprises at least one activated carbon fiber module having a side configured to be a gas inflow side and comprising a gas inflow side layer which is provided with gas inlet openings and is made of an electrically conductive material, and a side configured to be a gas outflow side and comprising a gas outflow side layer which is provided with gas outlet openings and is made of an electrically conductive material comprising an activated carbon fiber mat which is held in a compressed state by the gas inflow side and gas outflow side layers, wherein the gas outflow side layer has a larger free flow cross section for gas as compared to the gas inflow side layer, and the gas inflow side and the gas outflow side layers are electrically insulated with respect to one another and are connected to a voltage source, wherein the gas inflow side and the gas outflow side layers together with the activated carbon fiber mat form the current circuit in which current flows through the activated carbon fibers transversely to a direction in which the activated carbon fibers are oriented whereby the activated carbon fibers act as electrical resistance.

2. The device according to claim 1, wherein the activated carbon fiber module comprises:
a) as the gas inflow side layer, an inner cylindrical hollow body which comprises the electrically conductive material and the gas inlet openings are openings which are uniformly distributed over an outer surface of the inner hollow body for passage of gas transversely to a longitudinal axis of the inner hollow body and which have a flow cross section of 5% to 80% of the area of the outer surface;
b) as the activated carbon fiber mat, at least one activated carbon fiber wrap-around disposed around the inner hollow body;
c) as the gas outflow side layer, an outer cylindrical hollow body, which surrounds the activated carbon fiber wrap-around and comprises the electrically conductive material and the gas outlet openings are openings which are uniformly distributed over an outer surface of the outer hollow body for the passage of gas transversely to the longitudinal axis, and which have a flow cross section of 50% to 95% of the area of the outer surface of the outer hollow body, wherein the activated carbon fiber wrap-around is held between the inner and the outer hollow bodies in a radially compressed electrically conductive state; and
d) an electrical insulation of the inner and the outer hollow bodies, wherein the inner hollow body and the outer hollow body are connected to the voltage source and, together with the activated carbon fiber wrap-around, form the current circuit, in which the activated carbon fiber wrap-around is connected as resistance transversely to the direction of the activated carbon fibers.

3. The device according to claim 1, wherein the gas inflow side layer and the gas outflow side layer each comprise a metallic slotted or perforated plate or sieve or grating, which, depending on the pollutants to be adsorbed on the activated carbon fibers, is selected from the group consisting of copper, aluminum, magnesium and alloys thereof, iron or unalloyed steels, stainless steels, nickel-based alloys (Hastelloy), titanium or titanium alloys.

4. The device according to claim 1, wherein the gas inflow side and outflow side layers are configured to be fastened in an electrically non-conductive manner to a holder or accommodating base in the adsorption apparatus.

5. The device according to claim 1, wherein the gas inflow side layer comprises a connector for one pole of the voltage source, and the gas outflow side layer has a connector for another pole of the voltage source, wherein the voltage source is a DC voltage source, the potential difference of which, between the two poles, is selected between 10 V and 400 V, depending on thickness of the activated carbon fiber mat, and depending on the desorption temperature of the pollutants adsorbed on the activated carbon fibers.

6. The device according to claim 1, wherein the gas inflow side and the gas outflow side layers are connected to an AC power source, the voltage and frequency of which are adapted to the desorption temperature for the pollutants adsorbed on the activated carbon fibers, depending on thickness of the activated carbon fiber mat.

7. The device according to claim 2, wherein for the purpose of radial compression, the activated carbon fiber wrap-around of the outer hollow body has an inner diameter that is 0.01-fold to 0.4-fold smaller than the outer diameter of the activated carbon fiber wrap-around.

8. An adsorption apparatus containing the device according to claim 5 or 6, wherein the connectors are connected to the DC or AC power source via connection lines, which are self-supporting and are routed through a base of the adsorption module and a casing of the adsorption apparatus in a gas- and pressure-tight and electrically insulated manner, wherein the adsorption apparatus is configured so that as the pollutant-laden gas flows therethrough, the connection lines are connectable via switches to a ground connection of the adsorption apparatus during the adsorption of the pollutants on the activated carbon fibers in order to bleed off an electrostatic discharge, and are electrically disconnectable from the ground connection via the switches during the desorption of the adsorbed pollutants.

9. The device according to claim 6, wherein the outer hollow body of the activated carbon fiber module is surrounded by an inductor, which is connected to the AC power source in order to generate a high frequency magnetic field for heating the activated carbon fiber wrap-around.

10. The device according to claim 2, wherein the activated carbon fiber wrap-around (48) is formed from an activated carbon fiber fabric having a fiber diameter of 6 μm to 50 μm, a fiber length of 3 mm to 150 mm μm, and is formed from 3 to 300 layers.

11. The device according to claim 10, wherein the activated carbon fiber fabric has a prefabricated width that corresponds to axial length of the inner or the outer hollow body.

12. The device according to claim 11, wherein a plurality of wrapped-around prefabricated widths pushed next to one another are joined to one another as one overall wrap-around, which, together, have an axial length that corresponds to the product of the prefabricated width and the number of wrap-arounds joined to one another, and, by way of a strip on the abutting edges thereof, uncontrollable and non-uniform gas throughput is prevented.

13. The device according to claim 11, wherein the inner and outer hollow bodies have an axial length that is smaller than the prefabricated width, the activated carbon fiber wrap-around comprises at least two layers wrapped around the inner hollow body in a crisscross pattern.

14. The device according to claim 2, wherein the inner and outer hollow bodies with the activated carbon fiber wrap-around held therebetween is configured so that the activated carbon fiber wrap-around is replaceable.

15. The device according to claim 2, wherein the center axis with which the distributing conduit for the flush gas is coaxial is a longitudinal axis of the activated carbon fiber module.

16. The device according to claim 1, wherein the adsorption module is comprised of two mutually opposed gas permeable plates which are slanted outward relative to a base, the gas inflow and outflow side layers comprising respective faces of each of the plates, the plates being fastened, at bottom edges thereof, to the base and, at top edge thereof, to a holder in a pressure- and gas-tight and electrically non-conductive manner, and the plates enclosing a treatment section which is designed configured as a three-dimensional, closed trapezoid and in which the distributing conduit for the flush gas is disposed along a longitudinal axis of the adsorption module with a distal end of the distributing conduit proximate to the base.

17. An adsorption apparatus containing the device according to claim 16, wherein a plurality of the adsorption modules of claim 16 are disposed horizontally one after the other in a row in a housing of the adsorption apparatus, which, in cross section, has the shape of a parallelogram, wherein a gas inlet connection piece is disposed above the adsorption modules on an end face of the housing, a gas outlet connection piece is disposed under the adsorption modules on another end face of the housing, and an outlet connection piece for desorbate is disposed at a lowest point on the housing.

18. An adsorption apparatus containing the device according to claim 2, wherein a plurality of the activated carbon fiber modules are held in a housing in a triangular or quadrangular pitch on a receiving base, which is oriented perpendicularly to a longitudinal axis of the adsorption apparatus and is fastened in the adsorption apparatus in a gas- and pressure-tight and electrically non-conductive manner, wherein the inner and the outer hollow bodies of the activated carbon fiber modules are electrically insulated with respect to one another, and every inner hollow body encloses a treatment section in which a respective said distributing conduit is disposed along a longitudinal axis of each respective said activated carbon fiber module with a distal end of the distributing conduit proximate to a base plate of the inner hollow body of the activated carbon fiber module.

19. The device according to claim 18, wherein a gas inlet connection piece disposed in the housing of the adsorption apparatus is oriented horizontally in a direction of an inlet region of the activated carbon fiber modules and a gas outlet connection piece disposed in the housing of the adsorption apparatus is oriented opposite to the gas inlet connection piece, and wherein an outlet connection piece for the desorbate is disposed in the housing at a location lower than the gas inlet and gas outlet connection pieces.

20. A method for treating a gas laden with pollutants in a device according to claim 1, comprising applying the gas to at least one of the adsorption modules whereby the pollutants are adsorbed on the activated carbon fibers and subsequently regenerating the activated carbon fibers by heating the activated carbon fibers by conducting an electric current therethrough, and subsequently flushing the pollutants out of the activated carbon fibers using an inert flush gas by the following steps of:
   a) conducting the pollutant-laden gas through the activated carbon fiber mat
   b) forming an electrical current circuit between the gas inlet side and the and outlet side layers, flowing current through the activated carbon fiber mat transversely to the direction of the activated carbon fibers thereby to effect heating for the purpose of desorbing the pollutants.

21. The method according to claim 20, wherein the free flow cross section of the layers increases from 102% to a maximum of 300%, from the gas inlet side to the gas outlet side layer.

22. The method according to claim 20, wherein an activated carbon fiber module is used, to which DC current or low-frequency AC current is applied.

23. The method according to claim 22, wherein the activated carbon fiber module is produced by means of the following steps:
   a) rolling and joining a metallic slotted or perforated plate or a grid or grating to form an inner and an outer cylindrical hollow bodies having different diameters, as the gas inlet side and the gas outlet layers of the activated carbon fiber module;
   b) wrapping the inner hollow body with at least one wrap-around layer made of an activated carbon fiber mat and fastening the wrap-around layer, wherein the prefabricated width of the activated carbon fiber mat determines the axial length of the activated carbon fiber module; and
   c) radially compressing the activated carbon fiber wrap-around by axially sliding the outer hollow body onto the activated carbon fiber wrap-around, wherein the outer hollow body has an inner diameter, which is 0.01-fold to 0.4-fold smaller than the outer diameter of the activated carbon fiber wrap-around, and therefore the activated carbon fiber wrap-around is radially compressed and is held in an electrically conductive state.

24. The method according to claim 20, wherein the material for the inner and the outer layers is selected, depending on the pollutants adsorbed on the activated carbon fibers, from the group consisting of copper, aluminum, magnesium and alloys thereof, iron or unalloyed steels, stainless steels, nickel-based alloys (Hastelloy), titanium or titanium alloys.

25. The method according to claim 20, wherein, in order to regenerate the pollutant-laden activated carbon fibers in the modules, the adsorption apparatus is initially pressurized with nitrogen, for inertizing, to an overpressure of 0.1 bar to 1.0 bar and is subsequently depressurized, then the pressurization and depressurization are repeated multiple times until the oxygen content in the adsorption apparatus has dropped to <5%, and the activated carbon fibers are then heated in order to desorb the pollutants by switching on the current circuit, and are rinsed with an inert gas.

26. The method according to claim 20, wherein an inert gas is used as the flush gas.

27. The device according to claim 10, wherein the number of layers is three.

28. The method according to claim 26, wherein the inert gas is nitrogen.

* * * * *